United States Patent
Cairns (10) Patent No.: US 8,295,328 B2
(45) Date of Patent: Oct. 23, 2012

(54) DOPPLER FREQUENCY CONTROL OF G-RAKE RECEIVER

(75) Inventor: Douglas A. Cairns, Durham, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1266 days.

(21) Appl. No.: 11/548,528

(22) Filed: Oct. 11, 2006

(65) Prior Publication Data

US 2008/0089395 A1    Apr. 17, 2008

(51) Int. Cl.
*H04B 1/00* (2006.01)

(52) U.S. Cl. ........ 375/148; 375/130; 375/147; 375/316; 370/342; 370/335; 370/320; 370/341

(58) Field of Classification Search .............. 375/148, 375/130, 147, 316; 370/342, 335, 320, 341
See application file for complete search history.

(56) References Cited

U.S. PATENT DOCUMENTS

| | | | |
|---|---|---|---|
| 6,813,309 B1 * | 11/2004 | Ogino ........................ | 375/148 |
| 6,980,584 B1 * | 12/2005 | Yaguchi ..................... | 375/148 |
| 2001/0010686 A1 * | 8/2001 | Kubo et al. ................. | 370/335 |
| 2001/0033606 A1 * | 10/2001 | Akopian et al. ............. | 375/149 |
| 2002/0054621 A1 * | 5/2002 | Kyeong et al. ............... | 375/147 |
| 2003/0053522 A1 * | 3/2003 | Hayoun et al. ............... | 375/147 |
| 2004/0114695 A1 * | 6/2004 | Astely et al. ................. | 375/343 |
| 2005/0201447 A1 | 9/2005 | Cairns et al. | |
| 2006/0188007 A1 | 8/2006 | Daneshrad et al. | |
| 2007/0076785 A1 | 4/2007 | Reial et al. | |
| 2008/0089395 A1 * | 4/2008 | Cairns ......................... | 375/148 |

FOREIGN PATENT DOCUMENTS

EP    1560388 A1    8/2005

OTHER PUBLICATIONS

Gregory E. Bottomley, et al, "Advanced receivers for WCDMA terminal platforms and base stations," Ericson Review No. 2, 2006.

* cited by examiner

*Primary Examiner* — Zewdu Kassa (57) ABSTRACT

A control system and method for controlling a spread spectrum receiver such as a generalized Rake (G-Rake) receiver or chip equalizer based on a frequency shift ($f_D$) of a received signal. A hybrid channel estimator outputs a low-rate channel estimate such as a slot average channel estimate if $f_D$ is less than or equal to a threshold value. If $f_D$ is greater than the threshold, a plurality of high-rate channel estimates such as interpolated channel estimates is produced. An impairment covariance matrix estimates correlations between impairment on different fingers of the G-Rake receiver. The update rate of the matrix is controlled dependent on the value of $f_D$. A combining weights calculator then calculates sets of combining weights based on the channel estimates and the impairment correlation estimates.

10 Claims, 6 Drawing Sheets

DOPPLER FREQUENCY CONTROL OF G-RAKE RECEIVER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This invention relates to radio telecommunication systems. More particularly, and not by way of limitation, the invention is directed to a control system and method for controlling a spread-spectrum radio receiver such as a generalized Rake (G-Rake) receiver or a chip equalizer based on a frequency offset of a received signal.

RAKE receivers are well known in the communication arts and find widespread use in Code Division Multiple Access (CDMA) systems, such as in IS-95, IS-2000 (cdma2000), and Wideband CDMA (WCDMA) wireless communication networks. The name derives from the rake-like appearance of such receivers, wherein multiple, parallel receiver fingers are used to receive multiple signal images in a received multipath signal. By coherently combining the finger outputs in a RAKE combiner, the conventional RAKE receiver can use multipath reception to improve the Signal-to-Noise Ratio (SNR) of the received multipath signal.

However, as is known to those skilled in the art, the conventional RAKE receiver is optimal only in certain limited circumstances. For example, self-interference and multi-user access interference both degrade the performance of a conventional RAKE receiver. To that end, the assignee of the instant application has made application for one or more patents relating to the use of a "generalized" RAKE receiver architecture, wherein receiver performance is improved by increasing the sophistication of combining weight generation.

In the generalized RAKE architecture, the combining weight calculations consider correlations of one or more signal impairments across RAKE fingers. For example, a generalized RAKE receiver may track noise correlations across those fingers. Generalized RAKE receivers also may include a comparatively larger number of fingers such that extra fingers may be positioned off of the signal path delays. A generalized RAKE receiver may gain performance improvements by shifting these extra fingers to optimize the SNR of the received signal. Correlations of signal impairments can also be used in SNR estimating often referred to as signal-to-interference ratio (SIR) estimation. SIR estimation is used in power control as well as in monitoring link quality and rate adaptation.

Note that the G-Rake receiver builds on the Rake receiver to improve receiver performance. That is, the received signal is despread by correlators matched to particular signal delays, and then the despread values are weighted and combined. Since the despreading and combining operations are linear, the order may be interchanged without losing performance. A receiver structure known as a chip equalizer embodies such an approach. Here, weights are applied at the chip level to combine/equalize the received signal. The combined/equalized signal is then despread by a single correlator. The chip equalizer weights are also a function of the impairment covariance matrix.

Thus, both the G-Rake and chip equalizer receivers suppresses interference through combining weights that account for the overall interference plus noise environment. What follows is described in terms of a G-Rake receiver, but equivalent operations exist for a chip equalizer. Estimates of the received traffic symbols are obtained via:

$$z = w^H x, \tag{1}$$

where w is a vector of G-Rake combining weights, x is a vector of despread traffic symbols, and z is the traffic symbol estimate.

The G-Rake combining weight vector is obtained from:

$$w = R_u^{-1} h, \tag{2}$$

where $R_{ij}$ is the impairments covariance matrix (own-cell interference plus other-cell interference plus noise) and h is a vector of net channel coefficients, including the contributions of the transmit filter, radio channel, and receive filter.

The impairments covariance matrix is given by:

$$R_u = E_c(0) R_0(\tilde{g}_0) + \sum_{j=1}^{J} E_c(j) R_j(\tilde{g}_j) + N_0 R_n. \tag{3}$$

Here, E(j) is the energy per chip of base station j; the $R_0$ term represents own-cell interference; the summation of terms over j represents other-cell interference; and $N_0 R_n$ is the contribution of white noise passed through the receive filter. Note that equation (3) has been written to clearly illustrate the dependence of the impairments covariance matrix on the estimated medium channel coefficients $\tilde{g}$. The medium coefficients needed for (3) are obtained from estimates of net cofficients via:

$$\tilde{g}_j = \begin{bmatrix} R_p(\tau_j(0) - \tau_j(0)) & R_p(\tau_j(0) - \tau_j(1)) & \cdots & R_p(\tau_j(0) - \tau_j(L_j - 1)) \\ R_p(\tau_j(1) - \tau_j(0)) & R_p(\tau_j(1) - \tau_j(1)) & \cdots & R_p(\tau_j(1) - \tau_j(L_j - 1)) \\ \vdots & \vdots & \ddots & \\ R_p(\tau_j(L_j - 1) - \tau_j(0)) & R_p(\tau_j(L_j - 1) - \tau_j(1)) & \cdots & R_p(\tau_j(L_j - 1) - \tau_j(L_j - 1)) \end{bmatrix}^{-1} \hat{h}_j. \tag{4}$$

Here, $R_p(\tau)$ is the pulse shape autocorrelation function, $\tau_j$ is a vector of path delays for base station j ($L_j$ paths for base station j) and $\hat{h}$ is the estimate of the net channel coefficients.

Mobile terminals may utilize a low-rate channel estimation approach in order to reduce receiver complexity. For example, a mobile terminal may estimate net channel coefficients utilizing:

$$\hat{h}_j = \frac{1}{10}\sum_{k=0}^{9} x_p(k)s^*(k), \quad (5)$$

where $x_p(k)$ is a vector of despread pilot symbols for the $k^{th}$ symbol in a slot, and $s(k)$ is the $k^{th}$ pilot symbol in the slot. Note that this approach, referred to as the "slot average" estimate, produces one set of channel coefficients per slot.

The fundamental limitation of using low-rate channel estimation is that combining weights based on such estimates (see equations (2)-(4)) represent the average impairment scenario. When a mobile terminal is moving at low speed, the difference between the average and instantaneous impairment scenario is small, so the approach works well. However at moderate to high speed, the impairment scenario changes more rapidly, so there can be significant differences between the average and instantaneous impairment scenarios. This mismatch causes receiver performance to degrade, sometimes substantially.

What is needed in the art is a control system and method for producing unique combining weights in a spread-spectrum radio receiver which overcomes the shortcomings of the prior art. The present invention provides such a control system and method.

BRIEF SUMMARY OF THE INVENTION

The present invention provides a control system and method for controlling a spread-spectrum radio receiver such as a generalized Rake (G-Rake) receiver or a chip equalizer based on a frequency offset of a received signal. The invention combines a hybrid channel estimator with a technique for controlling the update rate of the impairment covariance matrix in order to account for varying interference and noise scenarios at different speeds of a mobile receiver while minimizing receiver complexity. The key to addressing the mismatch between the average and instantaneous impairment scenarios is to adapt the rate at which unique combining weights are produced to effectively suppress the instantaneous impairment scenario.

In one aspect, the present invention is directed to a method of controlling a spread spectrum receiver based on a frequency offset of a received, despread signal. The method includes obtaining the frequency offset of the received signal; and calculating combining weights based on the frequency offset. The combining weights may be calculated by the steps of: determining a low-rate channel estimation of the received signal if the frequency offset is less than or equal to a threshold value; determining a plurality of high-rate channel estimations of the received signal if the frequency offset is greater than the threshold value; determining based on the frequency offset, a number of unique channel estimations per slot; controlling based on the frequency offset, an update rate of an impairment covariance matrix utilized to produce impairment correlation estimates; and calculating an appropriate number of sets of combining weights per slot utilizing the channel estimates and the impairment correlation estimates.

In another aspect, the present invention is directed to a hybrid channel estimator, which includes a low-rate channel estimation unit for providing one low-rate channel estimate per slot of a received radio signal; a high-rate channel estimation unit for providing a plurality of high-rate channel estimates per slot of the received radio signal; and a selector for selecting whether to output the low-rate channel estimate or the high-rate channel estimates based on a frequency offset of the received radio signal.

In another aspect, the present invention is directed to a control system for a spread spectrum receiver. The control system includes an offset estimator for estimating a frequency offset ($f_D$) of the received signal; first channel estimation means for estimating a low-rate channel estimate from the received signal; second channel estimation means for estimating a plurality of high-rate channel estimates from the received signal; and selecting means for selecting either an output of the first channel estimation means or the second channel estimation means, depending on the value of $f_D$. The control system also includes means for controlling an update rate of an impairment covariance matrix for estimating correlations between impairment on different fingers of the receiver, wherein the matrix is updated at a rate dependent on the value of $f_D$. A combining weights calculator then calculates sets of combining weights based on the channel estimates and the impairment correlation estimates.

In one embodiment, the receiver is a G-Rake receiver, and the combining weights calculator includes a G-Rake controller in communication with the offset estimator to receive the value of $f_D$. The controller compares $f_D$ with a number of different threshold values, and based upon the comparisons, determines appropriate factors for calculating the sets of combining weights.

BRIEF DESCRIPTION OF THE SEVERAL VIEWS OF THE DRAWING

In the following, the essential features of the invention will be described in detail by showing preferred embodiments, with reference to the attached figures in which.

DETAILED DESCRIPTION OF THE INVENTION

The present invention provides a control system and method for controlling a spread-spectrum radio receiver such as a G-Rake receiver or a chip equalizer based on a frequency offset of a received signal. Although the invention is applicable to spread spectrum receivers in general, the description herein uses the G-Rake receiver to describe an exemplary embodiment. Having described the embodiment utilizing a G-Rake receiver, an embodiment using a chip equalizer should be easily attainable by those having ordinary skill in the art.

It should also be recognized that there are numerous potential causes for frequency offsets of a received signal, and the present invention is applicable to frequency offsets of any cause. For example, the frequency offset may be caused by a Doppler frequency shift due to the speed of the mobile terminal. Likewise, the frequency offset may be due to imperfect receiver synchronization. As used herein, the term "effective Doppler" refers to any such frequency offset of the received signal.

In the exemplary embodiment described below, the present invention specifically adapts the rate at which unique combining weights are produced in a G-Rake receiver to account for varying interference and noise scenarios caused by the effective Doppler of the received signal. The key to suppressing the instantaneous impairment is to produce combining weights tailored to the varying interference and noise scenarios. This requires producing unique combining weights at a sufficient rate to account for the varying interference and noise scenarios. The rate should not be too high (leading to excess complexity for little or no performance gain) nor too low (leading to degraded receiver performance).

Figure 1:
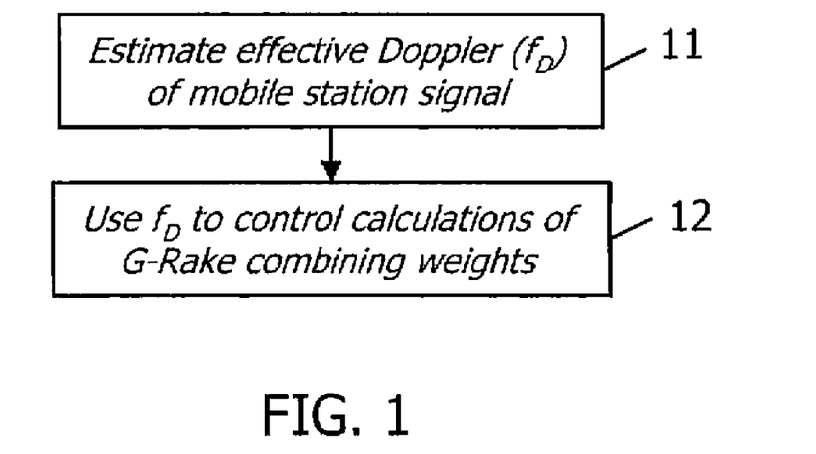
FIG. 1 is a flow chart illustrating the steps of an exemplary embodiment of the overall method of the present invention.

FIG. 1 is a flow chart illustrating the steps of an exemplary embodiment of the overall method of the present invention. At step 11, the effective Doppler frequency ($f_D$) is estimated. At step 12, the $f_D$ estimate is utilized to control calculations of the G-Rake combining weights.

Figure 2:
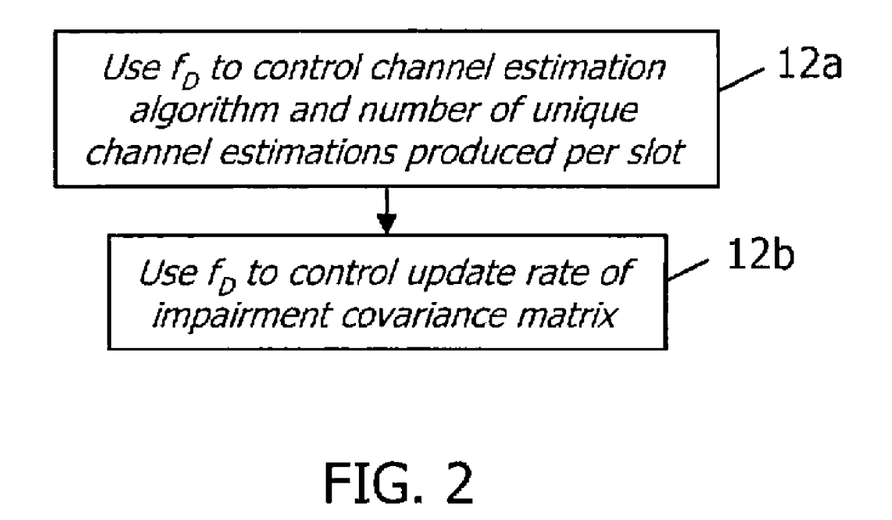
FIG. 2 is a flow chart illustrating in more detail, step 12 of FIG. 1.

FIG. 2 is a flow chart illustrating in more detail, step 12 of FIG. 1. The invention utilizes the effective Doppler, $f_D$, to control calculations of the G-Rake combining weights in two ways. The first way, illustrated at step 12a, is to control a channel estimation algorithm and the number of unique channel estimates produced per slot. The channel estimation may be a low-rate channel estimation or a high-rate channel estimation. For example, the low-rate channel estimation may be the slot-average channel estimation described above in equation (5), while the high-rate channel estimation may be an "interpolated" channel estimation described below in equation (6). These channel estimation techniques are, of course, exemplary only and other suitable channel estimation techniques may be utilized.

The second way the invention utilizes the effective Doppler, $f_D$, to control calculations of the G-Rake combining weights, illustrated at step 12b, is to control the update rate of an impairment covariance matrix utilized to produce impairment correlation estimates. The channel estimates and impairment correlation estimates are used to form the combining weights. The description below begins by describing the control of the channel estimation algorithm and then shows an integrated version of the invention.

The slot average approach shown in equation (5) provides one unique net channel estimate per slot. This approach is nearly optimal at low speed. In the present invention, this approach is combined with an alternate approach more suitable for moderate to high speed. The alternate approach may utilize any of a number of algorithms (KLMS, Wiener LMS, Kalman filtering, Wiener filtering, and the like) as discussed in G. Bottomley, H. Arslan, "Channel Tracking in Wireless Communication Systems", *Wiley Encyclopedia of Telecommunications*, 2002. In the preferred embodiment, the present invention utilizes a technique referred to herein as "interpolated" channel estimation. The equations for interpolated channel estimates are:

$$h_1 = \frac{1}{5}\sum_{k=0}^{4} x_p(k)s^*(k) \quad (6)$$

$$h_2 = \frac{1}{5}\sum_{k=5}^{9} x_p(k)s^*(k)$$

$$\hat{h}(m) = \left(\frac{7-m}{5}\right)h_1 + \left(\frac{m-2}{5}\right)h_2,$$

where m indexes the common pilot channel (CPICH) symbols in a slot. Note that m ranges from 0 to 9, so that anywhere from 1 to 10 channel estimates can be produced with this approach.

Figure 3:
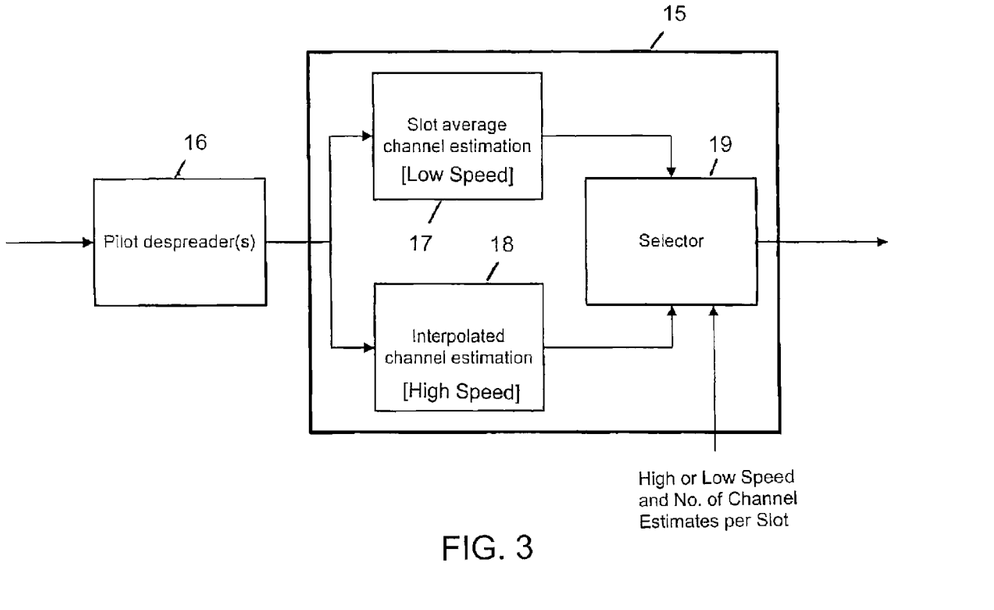
FIG. 3 is a simplified block diagram of a hybrid channel estimator in an exemplary embodiment of the present invention.
Figure 10:
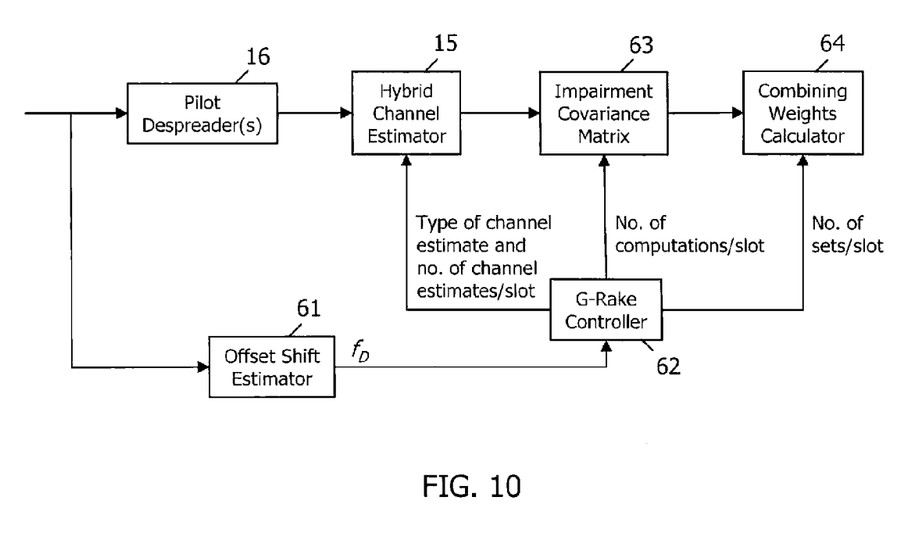
FIG. 10 is a simplified block diagram of an exemplary embodiment of the G-Rake receiver control system of the present invention.

FIG. 3 is a simplified block diagram of a hybrid channel estimator 15 in an exemplary embodiment of the present invention. After a received signal passes through one or more pilot despreaders 16, a low speed channel estimator such as a slot average channel estimator 17 and a high speed channel estimator such as an interpolated channel estimator 18 perform separate channel estimates. A selector 19 then selects whether to utilize the low speed channel estimate or the high speed channel estimate(s) based on an input received from a G-Rake controller (FIG. 10). The input also defines how many channel estimations are to be performed per slot.

Figure 4:
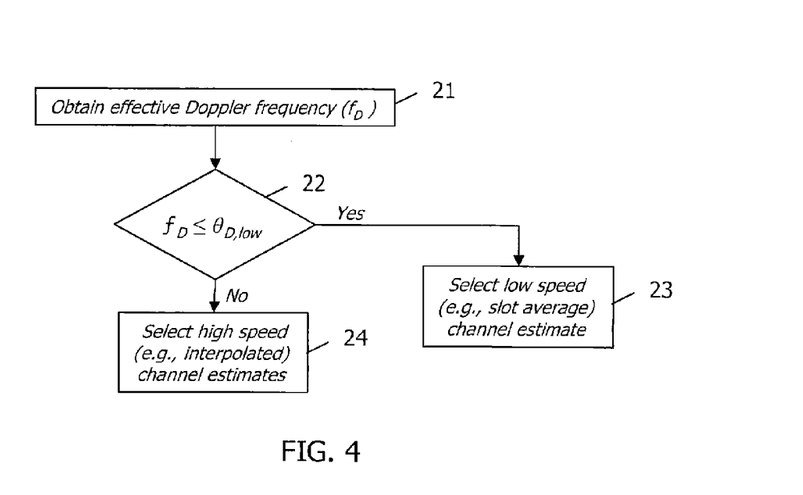
FIG. 4 is a flow chart illustrating the operating steps performed by the hybrid channel estimator of FIG. 3.

FIG. 4 is a flow chart illustrating the operating steps performed by the G-Rake controller 62 of FIG. 10 when determining the type of channel estimate to be output from the hybrid channel estimator 15. At step 21, an estimate of the effective Doppler frequency ($f_D$) is obtained. At step 22, $f_D$ is compared with a threshold $\theta_{D,low}$ to determined whether $f_D$ is less than or equal to $\theta_{D,low}$. If $f_D < \theta_{D,low}$, the method moves to step 23 where the low speed channel estimate (for example the slot average channel estimate) is selected with one unique estimate per slot (equation (5)). However, if $f_D > \theta_{D,low}$, the method moves to step 24 where the high speed channel estimate(s) (for example the interpolated channel estimate(s)) are selected with one or more unique estimates per slot (equation (6)). It is noted that the interpolated channel estimation approach is capable of generating anywhere from 1-10 channel estimates per slot. The selected type of channel estimate and the number of channel estimates per slot is then provided to the selector 19 in the hybrid channel estimator.

The present invention combines the hybrid channel estimator 15 described above with a technique for controlling the update rate of the impairment covariance matrix in order to minimize receiver complexity. The impairment covariance matrix estimates the correlation between the impairment (interference plus noise) on different fingers of the G-Rake receiver. There are four operating regions or modes for the integrated form of the invention. The G-Rake controller 62 selects the operating mode based on the effective Doppler frequency ($f_D$).

Figure 5:
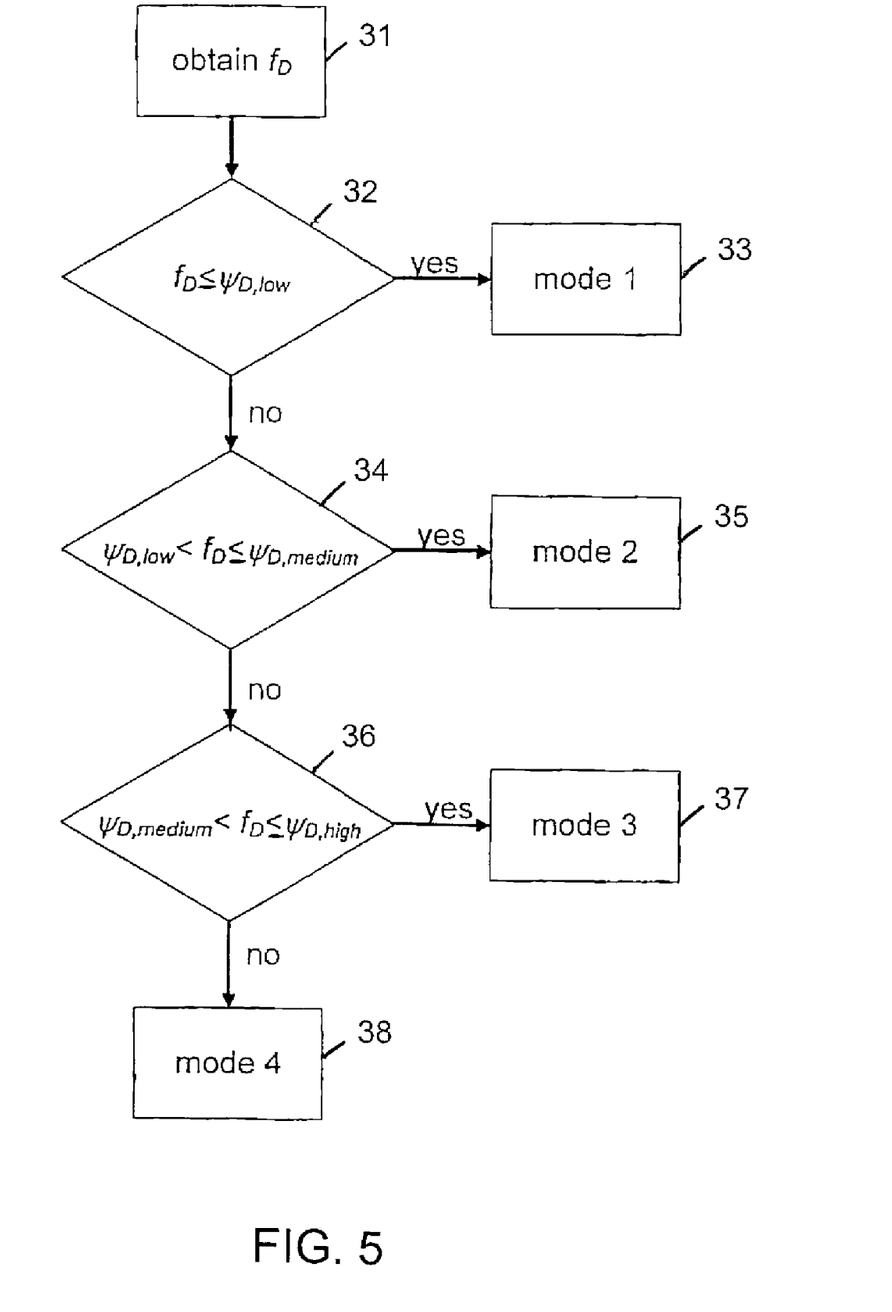
FIG. 5 is a flow chart illustrating the steps in a method of selecting an operating mode utilizing the hybrid channel estimator of FIG. 3 and a technique for controlling the update rate of the impairment covariance matrix.

FIG. 5 is a flow chart illustrating the steps of an exemplary method of selecting an appropriate operating mode combined with the technique for controlling the update rate of the impairment covariance matrix. In this example, different values of the effective Doppler, $f_D$, create different impairment scenarios. Therefore, the invention adapts the update rate of the impairment covariance matrix based on different values of $f_D$.

At step 31, an estimate of the effective Doppler frequency, $f_D$, is obtained. At step 32, it is determined whether $f_D \leq \Psi_{D,low}$. If so, the method performs a first operating mode (mode 1) process at step 33. If not, the method moves to step 34 where it is determined whether $\Psi_{D,low} < f_D \leq \Psi_{D,medium}$. If so, the method performs a second operating mode (mode 2) process at step 35. If not, the method moves to step 36 where it is determined whether $\Psi_{D,medium} < f_D \leq \Psi_{D,high}$. If so, the method performs a third operating mode (mode 3) process at step 37. If not, the method moves to step 38 where the method performs a fourth operating mode (mode 4) process. Each operating mode is described in more detail below.

Figure 6:
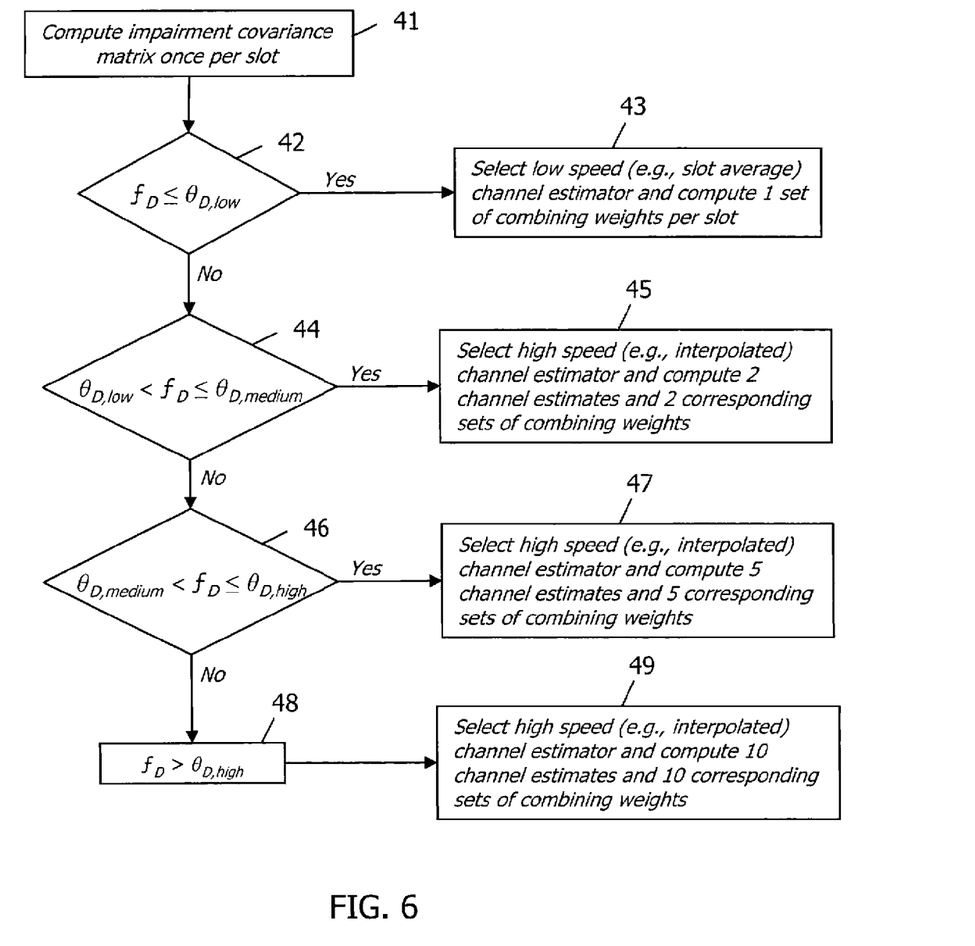
FIG. 6 is a flow chart illustrating the steps in a first operating mode selected by the method of FIG. 5.

FIG. 6 is a flow chart illustrating the steps in the first operating mode (mode 1) selected by the method of FIG. 5. Mode 1 covers the situation in which $f_D \leq \Psi_{D,low}$. At step 41, an impairment covariance matrix is computed once per slot. It should be noted that equation (4) may be used to obtain medium channel coefficients regardless of whether slot average or interpolated net channel coefficients are used to compute combining weights. At step 42, the Doppler estimate $f_D$ is then compared with $\theta_{D,low}$. (Note: $\theta_{D,low} < \theta_{D,medium} < \theta_{D,high} < \Psi_{D,low}$).

If $f_D \leq \theta_{D,low}$, the process moves to step 43 where the invention selects the output of the low speed (e.g., slot average) channel estimator 17 and computes one set of combining weights per slot. However, if $f_D > \theta_{D,low}$, the process moves to step 44 where it is determined whether $\theta_{D,low} < f_D \leq \theta_{D,medium}$. If so, the process moves to step 45 where the invention selects the output of the high speed (e.g., interpolated) channel estimator 18 and computes two channel estimates (m=2 and 7 in equation (6)) and the corresponding two sets of combining weights. However, if $f_D > \theta_{D,medium}$, the process moves to step 46.

At step 46, it is determined whether $\theta_{D,medium} < f_D \leq \theta_{D,high}$. If so, the process moves to step 47 where the invention selects the output of the high speed (e.g., interpolated) channel estimator 18 and computes five channel estimates (m=1,3,5,7, and 9 in equation (6)) and the corresponding five sets of combining weights. However, if $f_D$ does not fall in this range, the process moves to step 48 where it is concluded that $f_D > \theta_{D,high}$. At step 49, the invention selects the output of the high speed (e.g., interpolated) channel estimator and computes ten channel estimates and the corresponding ten sets of combining weights.

Figure 7:
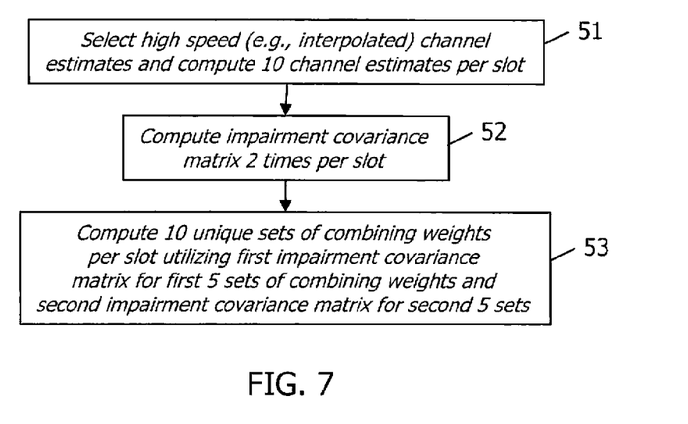
FIG. 7 is a flow chart illustrating the steps in a second operating mode selected by the method of FIG. 5.

FIG. 7 is a flow chart illustrating the steps in the second operating mode (mode 2) selected by the method of FIG. 5. Mode 2 covers the situation in which $\Psi_{D,low} < f_D \leq \Psi_{D,medium}$. At step 51, the invention selects the output of the high speed (e.g., interpolated) channel estimator 18 and computes ten channel estimates per slot. At step 52, the impairment covariance matrix is computed two times per slot utilizing m=2 net channel estimate in the first impairment covariance estimate and m=7 net channel estimate in the second impairment covariance estimate. At step 53, the invention computes ten unique sets of combining weights per slot utilizing the first of the two impairment covariance estimates for the first five sets of combining weights, and the second impairment covariance estimate for the last five sets of combining weights.

Figure 8:
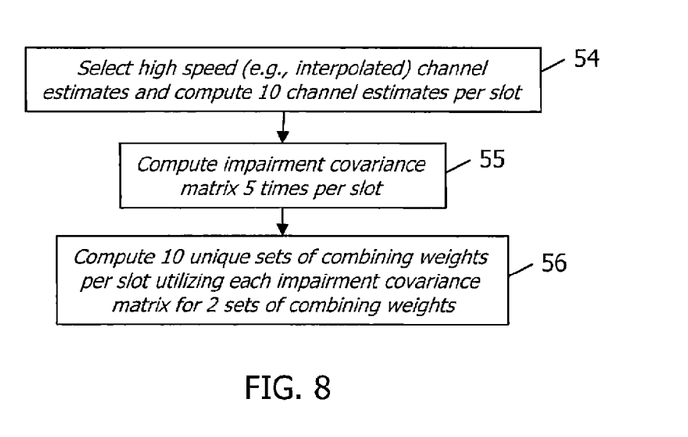
FIG. 8 is a flow chart illustrating the steps in a third operating mode selected by the method of FIG. 5.

FIG. 8 is a flow chart illustrating the steps in the third operating mode (mode 3) selected by the method of FIG. 5. Mode 3 covers the situation in which $\Psi_{D,medium} < f_D \leq \Psi_{D,high}$. At step 54, the invention selects the output of the high speed (e.g., interpolated) channel estimator 18 and computes ten channel estimates per slot. At step 55, the impairment covariance matrix is computed five times per slot utilizing net channel estimates corresponding to m=1,3,5,7 and 9 for the five impairment covariance matrix estimates. At step 56, the invention computes ten unique sets of combining weights per slot utilizing each of the five impairment covariance estimates for two sets of combining weights. For example, the first impairment covariance estimate may be utilized for the first two sets of combining weights; the second covariance estimate may be utilized for the third and fourth sets of combining weights, and so on.

Figure 9:
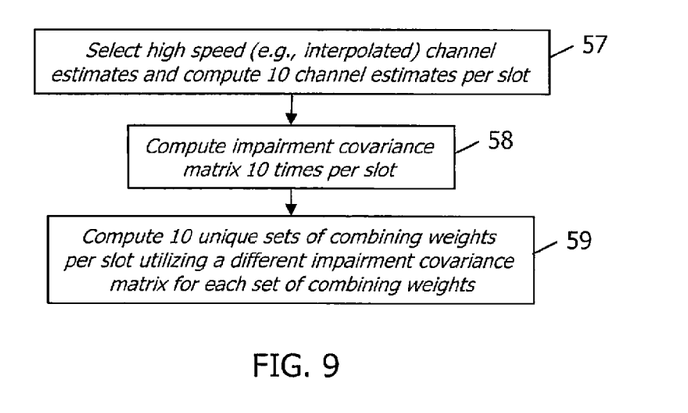
FIG. 9 is a flow chart illustrating the steps in a fourth operating mode selected by the method of FIG. 5.

FIG. 9 is a flow chart illustrating the steps in the fourth operating mode (mode 4) selected by the method of FIG. 5. Mode 4 covers the situation in which $f_D > \Psi_{D,high}$. At step 57, the invention selects the output of the high speed (e.g., interpolated) channel estimator 18 and computes ten channel estimates per slot. At step 58, the impairment covariance matrix is computed ten times per slot. At step 59, the invention computes ten unique sets of combining weights per slot utilizing a different impairment covariance estimate for each set of combining weights.

FIG. 10 is a simplified block diagram of an exemplary embodiment of the G-Rake receiver control system of the present invention. A received signal is despread by the pilot despreader(s) 16 and provided to the hybrid channel estimator 15. An offset shift estimator 61 estimates the effective Doppler frequency shift ($f_D$) of the received signal and provides $f_D$ to a G-Rake controller 62. The G-Rake controller compares $f_D$ with a number of different threshold values to determine the appropriate factors for calculating the combining weights.

The controller uses $f_D$ to determine which mode to enter, in accordance with FIG. 5. The G-Rake controller compares $f_D$ with the threshold value, $\theta_{D,low}$, to determine whether a low-rate channel estimate or a number of high-rate channel estimates should be used. The controller then sends an instruction to the hybrid channel estimator 15 and indicates the type of channel estimate and the number of channel estimates per slot to be output. The G-Rake controller also controls the update rate of the impairment covariance matrix 63 in order to produce an appropriate number of impairment correlation estimates per slot. Finally, the G-Rake controller instructs the combining weights calculator 64 to calculate an appropriate number of sets of combining weights per slot.

Thus, as described above, the present invention scales the processing required by the G-Rake receiver as needed to prevent performance degradation.

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. The specification contemplates any all modifications that fall within the scope of the invention defined by the following claims.

What is claimed is:

1. A method of controlling a generalized Rake (G-Rake) spread spectrum receiver based on a frequency shift of a received, despread signal, said method comprising:
   obtaining by an offset shift estimator, the frequency shift of the received signal; and
   calculating by a controller, G-Rake combining weights based on the frequency shift, wherein the calculating step includes utilizing the frequency shift for:
   controlling a channel estimation algorithm;
   determining a number of unique channel estimations per slot; and
   controlling an update rate of an impairment covariance matrix utilized to produce impairment correlation estimates for different fingers of the G-Rake receiver;
   wherein the step of controlling the channel estimation algorithm includes:
   determining by the controller, a low-rate channel estimation of the received signal;

determining by the controller, a plurality of high-rate channel estimations of the received signal; and selecting by the controller, either the low-rate channel estimation or the high-rate channel estimations based on the frequency shift; and wherein, when the frequency shift is less than or equal to a first threshold value, the step of calculating G-Rake combining weights based on the frequency shift also includes:

selecting the low-rate channel estimation;

computing the impairment covariance matrix once per slot; and computing one set of combining weights per slot.

2. The method according to claim 1, wherein the step of calculating G-Rake combining weights based on the frequency shift includes:

if the frequency shift is greater than the first threshold value and less than or equal to a second, higher threshold value:

selecting the high-rate channel estimations;

computing ten channel estimates per slot;

computing a first and second impairment covariance matrix per slot; and computing ten unique sets of combining weights per slot utilizing the first impairment covariance matrix for the first five sets of combining weights and the second impairment covariance matrix for the second five sets of combining weights.

3. The method according to claim 2, wherein the step of calculating G-Rake combining weights based on the frequency shift includes:

if the frequency shift is greater than the second threshold value and less than or equal to a third, higher threshold value:

selecting the high-rate channel estimations;

computing ten channel estimates per slot;

computing the impairment covariance matrix five times per slot; and computing ten unique sets of combining weights per slot utilizing each impairment covariance matrix for two sets of combining weights.

4. The method according to claim 3, wherein the step of calculating G-Rake combining weights based on the frequency shift includes:

if the frequency shift is greater than the third threshold value:

selecting the high-rate channel estimations;

computing ten channel estimates per slot;

computing the impairment covariance matrix ten times per slot; and computing ten unique sets of combining weights per slot utilizing each impairment covariance matrix for a different set of combining weights.

5. A method of controlling a chip equalizer spread spectrum receiver based on a frequency shift of a received, despread signal, said method comprising:

obtaining by an offset shift estimator, the frequency shift of the received signal; and calculating by a controller, combining weights based on the frequency shift, wherein the calculating step includes utilizing the frequency shift for:

controlling a channel estimation algorithm;

determining a plurality of unique channel estimations per slot; and controlling an update rate of an impairment covariance matrix utilized to produce chip combining weights for the chip equalizer;

wherein the step of controlling the channel estimation algorithm includes:

determining by the controller, a low-rate channel estimation of the received signal;

determining by the controller, a plurality of high-rate channel estimations of the received signal; and selecting by the controller, either the low-rate channel estimation or the high-rate channel estimations based on the frequency shift; and wherein, when the frequency shift is less than or equal to a first threshold value, the step of calculating combining weights based on the frequency shift also includes:

selecting the low-rate channel estimation;

computing the impairment covariance matrix once per slot; and computing one set of combining weights per slot.

6. A control system for a spread spectrum receiver, comprising:

a shift estimator for estimating a frequency shift ($f_D$) of a received signal;

first channel estimation means for estimating a low-rate channel estimate from the received signal;

second channel estimation means for estimating a plurality of high-rate channel estimates from the received signal;

selecting means for selecting either an output of the first channel estimation means or the second channel estimation means, depending on the value of $f_D$;

means for controlling an update rate of an impairment covariance matrix for estimating correlations between impairment on different fingers of the G-Rake receiver, said matrix being updated at a rate dependent on the value of $f_D$; and a combining weights calculator for calculating sets of combining weights based on the channel estimates and the impairment correlation estimates, the combining weights calculator including:

a controller in communication with the shift estimator to receive the value of $f_D$, said controller comparing $f_D$ with a number of different threshold values, and based upon the comparisons, determining appropriate factors for calculating the sets of combining weights, said controller including:

means for controlling the hybrid channel estimator o produce an appropriate number of channel estimates per slot;

means for controlling the impairment covariance matrix to produce an appropriate number of impairment correlation estimates per slot; and means for controlling the combining weights calculator to calculate an appropriate number of sets of combining weights per slot utilizing the channel estimates and the impairment correlation estimates.

7. The control system according to claim 6, wherein the first channel estimation means, second channel estimation means, and selecting means are implemented in a hybrid channel estimator in communication with the shift estimator to receive the value of $f_D$.

8. A method of controlling a generalized Rake (G-Rake) spread spectrum receiver based on a frequency shift of a received signal, said method comprising:

obtaining by an offset shift estimator, the frequency shift of the received signal;

despreading the received signal by a despreader; and calculating by a controller, G-Rake combining weights based on the frequency shift, wherein the calculating step includes:

controlling based on the frequency shift, an update rate of an impairment covariance matrix utilized to produce impairment correlation estimates;

calculating an appropriate number of sets of G-Rake combining weights per slot utilizing the channel estimates and the impairment correlation estimates; and utilizing the frequency shift for:
- determining a low-rate channel estimation of the received signal if the frequency shift is less than or equal to a first threshold value;
- determining a plurality of high-rate channel estimations of the received signal if the frequency shift is greater than the first threshold value; and
- determining based on the frequency shift, a number of unique channel estimations per slot.

9. A method of controlling a chip equalizer spread spectrum receiver based on a frequency shift of a received signal, said method comprising:

obtaining by an offset shift estimator, the frequency shift of the received signal;

despreading the received signal by a despreader; and calculating by a controller, combining weights based on the frequency shift, wherein the calculating step includes:

controlling based on the frequency shift, an update rate of an impairment covariance matrix utilized to produce impairment correlation estimates;

calculating an appropriate number of sets of chip combining weights per slot utilizing the channel estimates and the impairment correlation estimates; and utilizing the frequency shift for:
- determining a low-rate channel estimation of the received signal if the frequency shift is less than or equal to a first threshold value;
- determining a plurality of high-rate channel estimations of the received signal if the frequency shift is greater than the first threshold value; and
- determining based on the frequency shift, a number of unique channel estimations per slot.

10. A controller for a generalized Rake (G-Rake) receiver, comprising:

a shift estimator for estimating a value of a frequency shift ($f_D$) of a received signal;

channel estimation control means for instructing a hybrid channel estimator to selectively output either a low-rate channel estimate for the received signal or a plurality of high-rate channel estimates for the received signal, depending on the value of $f_D$;

means for controlling an update rate of an impairment covariance matrix for estimating correlations between impairment on different fingers of the G-Rake receiver, said matrix being updated at a rate dependent on the value of $f_D$; and a combining weights calculator for calculating a determined number of sets of combining weights based on the output channel estimates and the updated impairment correlation estimates, the combining weights calculator including:

a controller in communication with the shift estimator to receive the value Of $f_D$, said controller comparing $f_D$ with a number of different threshold values, and based upon the comparisons, determining appropriate factors for calculating the sets of combining weights, said controller including:

means for controlling the hybrid channel estimator to produce an appropriate number of channel estimates per slot, means for controlling the impairment covariance matrix to produce an appropriate number of impairment correlation estimates per slot; and means for controlling the combining weights calculator to calculate an appropriate number of sets of combining weights per slot utilizing the channel estimates and the impairment correlation estimates.

* * * * *

UNITED STATES PATENT AND TRADEMARK OFFICE
CERTIFICATE OF CORRECTION

PATENT NO. : 8,295,328 B2
APPLICATION NO. : 11/548528
DATED : October 23, 2012
INVENTOR(S) : Cairns It is certified that error appears in the above-identified patent and that said Letters Patent is hereby corrected as shown below:

On the Title Page, in Field (56), under "OTHER PUBLICATIONS", in Column 2, Line 2, delete "Ericson" and insert -- Ericsson --, therefor.

In Column 2, Line 46, delete "cofficients" and insert -- coefficients --, therefor.

In Column 7, Line 3, delete " $\Psi_{D,medium} < f_D \leq \Psi_{D,high}$. " and insert -- $\Psi_{D,medium} < f_D \leq \Psi_{D,high}$. --, therefor.

In Column 7, Line 23, delete " $< f_D \leq \theta_{D,medium}$. " and insert -- $< f_D \leq \theta_{D,medium}$. --, therefor.

In Column 10, Line 43, in Claim 6, delete "o" and insert -- to --, therefor.

In Column 12, Line 23, in Claim 10, delete "Of" and insert -- of --, therefor.

Signed and Sealed this
Nineteenth Day of February, 2013

Teresa Stanek Rea
*Acting Director of the United States Patent and Trademark Office*